(12) United States Patent
Chiu et al.

(10) Patent No.: US 6,208,478 B1
(45) Date of Patent: Mar. 27, 2001

(54) READ CLOCK INTERFACE FOR READ CHANNEL DEVICE

(75) Inventors: Kar Shing Chiu; Ming-Tak Leving, both of Sunnyvale, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/110,647

(22) Filed: Jul. 7, 1998

(51) Int. Cl.[7] ....................................................... G11B 5/09
(52) U.S. Cl. .................................................. 360/51; 360/46
(58) Field of Search .................. 360/67, 46, 51; 341/100

(56) References Cited

U.S. PATENT DOCUMENTS 5,793,806 * 8/1998 Maeda et al. .......................... 375/232
5,848,046 * 12/1998 Sawada ................................. 369/124

* cited by examiner

Primary Examiner—Nabil Hindi
Assistant Examiner—Regina Y. Neal
(74) Attorney, Agent, or Firm—W. Daniel Swayze, Jr.; Wade James Brady, III; Frederick J. Telecky, Jr.

(57) ABSTRACT

A read clock interface includes a serial-to-parallel converter for receiving two interleaved serial data streams read out from a disk and converting the serial data to 17-bit parallel data, and a state machine for receiving a clock signal having a frequency one-half that of a frequency at which the serial data is read out from the disk and frequency dividing the clock signal to generate a conversion clock signal consisting of alternating conversion cycles each having an even number of cycles of the clock signal, wherein the serial-to-parallel converter converts the serial data to parallel data at each conversion cycle of the conversion signal. In the preferred embodiment, the conversion signal consists of alternating conversion cycles of 16 and 18 cycles of the clock signal.

9 Claims, 5 Drawing Sheets

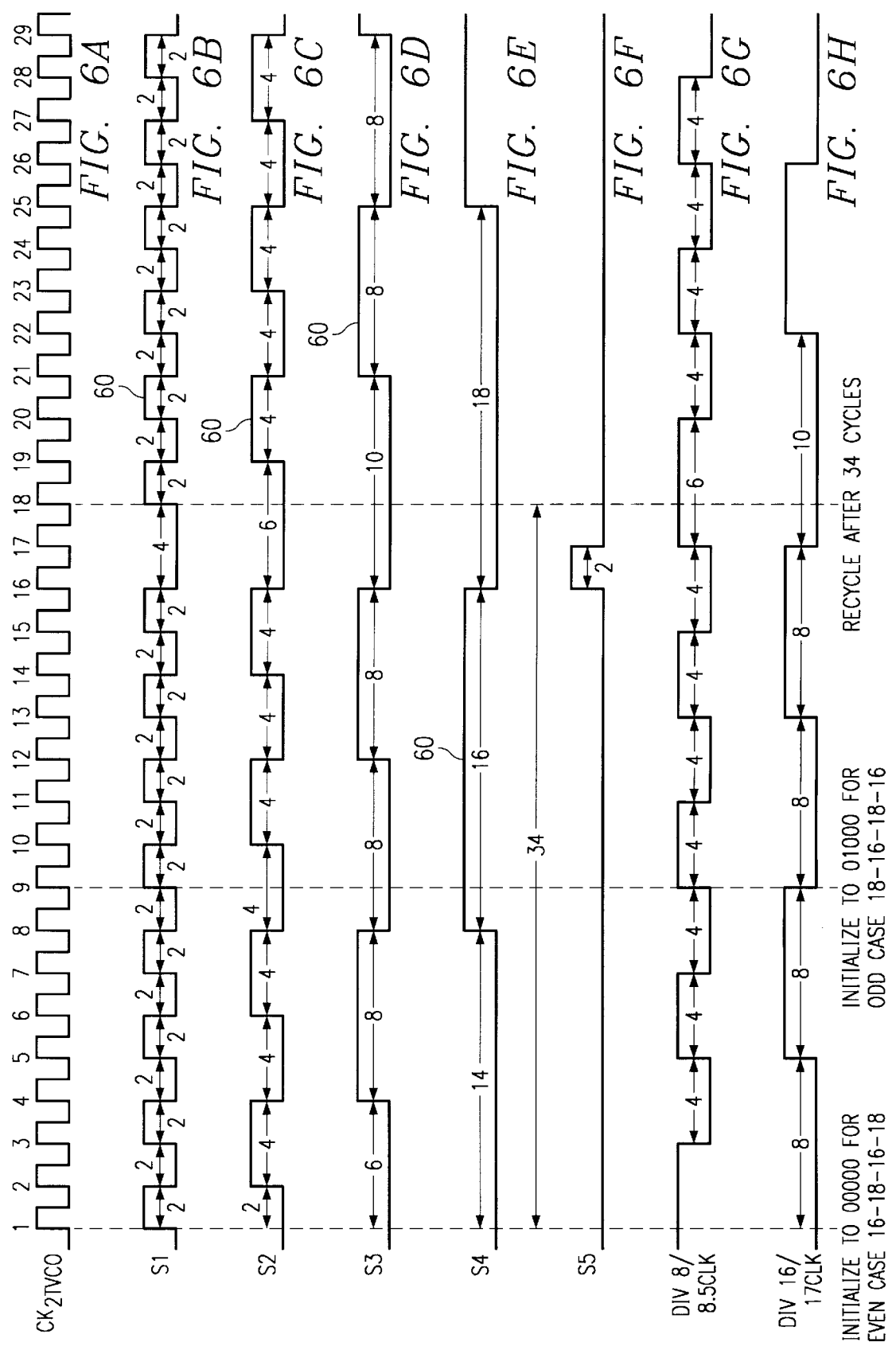

READ CLOCK INTERFACE FOR READ CHANNEL DEVICE

FIELD OF THE INVENTION

The present invention relates to the field of read channel devices, and more particularly to a read channel interface which employs a novel clocking scheme in the serial to parallel conversion of data read out from a hard disk. This invention finds utility in removable and non-removable non-volatile storage applications.

BACKGROUND OF THE INVENTION

Read channel devices serve as interfaces between a hard disk on which digital information is stored and external devices which receive and process the digital information in various applications. Digital data may be encoded in a suitable format and stored on a hard disk. During retrieval, this stored data must be decoded and converted to a format compatible with hard disk drives that will process the data.

FIG. 1 illustrates a conventional system for reading out data stored on a hard disk. Digital data encoded and stored on disk 11 is read out as a serial data bit stream. The data is filtered and amplified by filter/amplifier 12 and sampled by digital signal processor 13. A Viterbi sequence detector 14 produces the maximum likelihood estimate of the transmitted sequence and interleaves the data into two serial bit streams. The data is then input to the read channel device 15. Read channel device 15 receives 2-bit interleaved data and outputs the data in parallel, byte-wide form. Read channel device 15 is shown in more detail in FIG. 2.

Referring to FIG. 2, clock generator 23 generates a clock signal running at the code rate, or the frequency at which data is read out of the hard disk 11, typically 297.5 MHz. A divide-by-17 clock is then derived from the clock signal by successively frequency dividing the clock signal. The divide-by-17 clock is input to the framing circuit 21 to synchronize the serial to parallel data conversion, as will now be explained.

Framing circuit 21 receives two interleaved serial data streams read out from disk 11 and converts the serial data to 17-bit parallel data in accordance with the 16/17 Run Length Limited (RLL) code format for the read channel device. This is accomplished by "grabbing" 17 bits of serial data every 17 cycles of the code rate clock (every transition of the divide-by-17 clock) from a shift register. FIG. 3 illustrates the interleaved serial data organized into 17-bit parallel data blocks.

Referring to FIG. 3, note that the serial data is interleaved into two bit streams, denoted as even and odd. For example, serial bit 0 (the first bit read out from the hard disk) enters the even bit stream, serial bit 1 enters the odd bit stream, serial bit 2 enters the even bit stream, and so on. Framing circuit 21 "grabs" the first 17 data bits (bits 0–16) from the two serial data streams and groups the 17 bits into a parallel data word. Next, the framing circuit grabs the next 17 bits (bits 17–33) in a similar fashion to form the next parallel data word, and the data conversion continues in this fashion.

The framed 17-bit parallel data is then input to decoder 22, shown in FIG. 2. Using information stored in a timing bit, decoder 22 converts the incoming 17-bit data into 16 bit parallel data words. The 16-bit buffer 24 organizes the data into two standard 8-bit bytes. Test circuit 25 performs a test on the readout data. The NRZ circuit 26 derandomizes the data sequence and outputs 8-bit bytes to the external world.

The above-described decoding scheme suffers from several drawbacks relating to its operation at the code rate. First, power dissipation is high while operating at the code rate. Second, the generation of a divide-by-17 clock requires the use of a 6-stage state machine, thereby increasing implementation size. The higher frequency clock also places requirements on the timing logic and thus creates a limitation on the maximum speed of the read data path.

What is desired is a serial to parallel conversion interface in the read path of a read channel device that is easily implemented, operates efficiently at increased speed, and that consumes a minimum amount of power.

SUMMARY OF THE INVENTION

It is an object of the present invention to provide a novel read clock interface which utilizes a state machine running at one-half the code rate (i.e., 150 MHz). Data are acquired from the two interleaved serial streams at recurring periods of 16 and 18 clock cycles, rather than 17 clock cycles. The present invention is fully compatible with prior art interfaces and data formats. Operating at one-half of the code rate requires only a 5-stage state machine, which allows a smaller circuit implementation size as well as increased speed and reduced power consumption.

To achieve the above objects, the present invention includes a serial-to-parallel converter for receiving two interleaved serial data streams read out from a disk and converting the serial data to 17-bit parallel data, a state machine for receiving a clock signal having a frequency one-half that of a frequency at which the serial data is read out from the disk and frequency dividing the clock signal to generate a conversion clock signal consisting of alternating conversion cycles each having an even number of cycles of the clock signal, wherein the serial-to-parallel converter converts the serial data to parallel data at each conversion cycle of the conversion signal. In the preferred embodiment, the conversion signal consists of alternating conversion cycles of 16 and 18 cycles of the clock signal.

BRIEF DESCRIPTION OF THE DRAWING FIGURES

The purpose and advantages of the present invention will be apparent to those skilled in the art from the following detailed description in conjunction with the appended drawings in which like reference characters are used to indicate like elements, and in which:

FIG. 6 is a timing diagram illustrating the operation of the read clock state machine of FIG. 5.

DETAILED DESCRIPTION OF THE INVENTION

The present invention provides a novel serial-to-parallel converter which includes a read clock state machine for generating a clock by which serial data is converted to parallel data, and a Sync Frame Detect and Resynch circuit for synchronizing the read clock state machine in accordance with incoming serial data read out from a hard disk.

Figure 5:
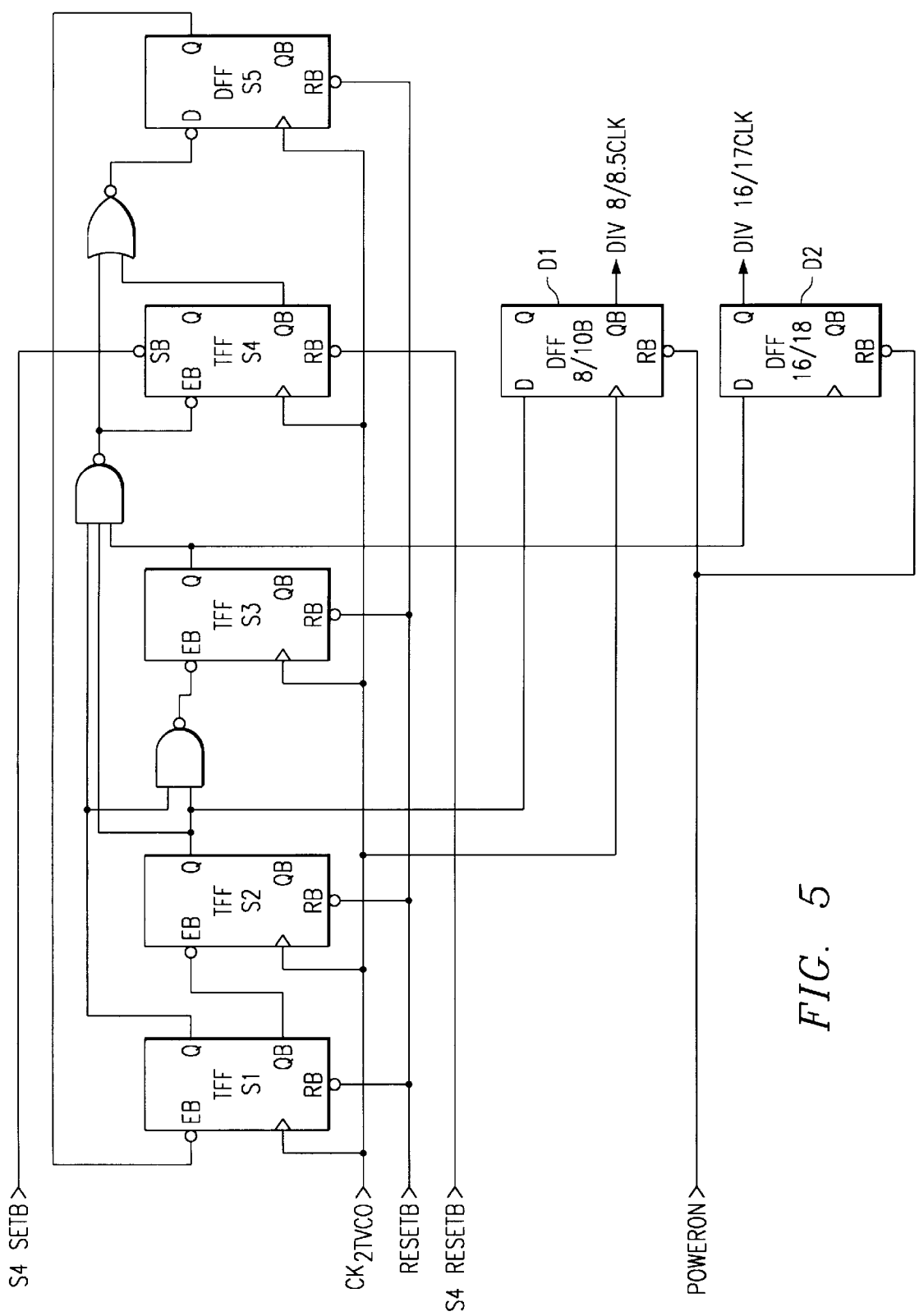
FIG. 5 illustrates a read clock state machine in accordance with an embodiment of the present invention.

FIG. 5 illustrates a read clock state machine in accordance with the present invention. The read clock state machine includes five memory elements S1–S5 which yield a total of $2^5=32$ possible states. In the preferred embodiment, the memory elements are represented as T flip-flops (TFF) and D flip-flops (DFF), however other suitable elements may be employed. The operation of the read clock state machine is best understood with reference to the timing diagram of FIG. 6.

Referring to FIG. 6(a), the input clock $CK_{2TVCO}$ operates at one-half of the code rate, or 297.5/2=148.75 MHz and is input to each of memory elements S1–S5. Clock $CK_{2TVCO}$ is generated by a Viterbi detector. Memory elements S1–S4 successively halve the frequency of the $CK_{2TVCO}$ clock input, as illustrated in FIG. 6(b)–(e). In this capacity, memory elements S1–S4 operate as a standard divide-by-2 frequency counter implemented in flip-flops. Memory element S5 acts as a count-up-to-16 counter the output of which remains low for 15 full clock cycles of $CK_{2TVCO}$ and goes high for two cycles when the outputs of each of memory elements S1–S4 drop low simultaneously on the rising edge of $CK_{2TVCO}$ #16 (See FIG. 6(f)). It is this S5 pulse which causes the output pulses 60 of memory elements S1–S4 that occur at the time of the S5 pulse to be extended by 2 clock cycles beyond their expected duration. Thus, the output of S1 during this time period is four clock cycles long, the output of S2 during this time period is six clock cycles long, the output of S3 during this time period is eight clock cycles long, etc.

The output of memory element S3 (FIG. 6(d)) is high for eight clock cycles, low for eight cycles, high for eight cycles, and low for ten cycles. This 8-8-8-10 cycle is repeated and forms the basis for the conversion of 2 interleaved serial data streams to 17-bit parallel data. That is, the 8-8-8-10 cycles can also be represented as 16–18 cycles, where the 16 derives from the eight high, eight low, and the 18 from the eight high, ten low. The output of the S3 flip-flop is input to D-flip flop D2 which synchronizes the incoming clock signal with the occurrence of incoming serial data bits. The output of flip-flop S2 is input to D-flip flop D1 which outputs a clock signal that groups the serial data from the disk into 8-bit bytes suitable for processing in external devices. The outputs of flip-flops D1 and D2 are illustrated in FIGS. 6(g) and (h), respectively.

Seventeen consecutive bits of data (bits 0–16) are grouped during the first 16 cycles, then the next consecutive 17 bits (bits 17–33) are grouped during the next 18 cycles, and the data conversions continues in this fashion. Thus, 2-bit interleaved serial data is converted to 17-bit parallel data using a clock running at one-half the code rate.

Figure 1:
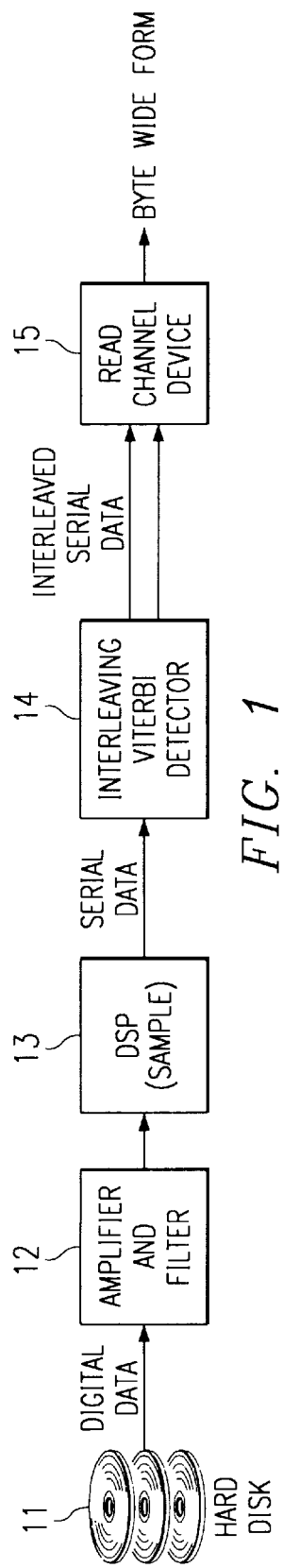
FIG. 1 is a block diagram illustrating a conventional digital data decoding system.
Figure 2:
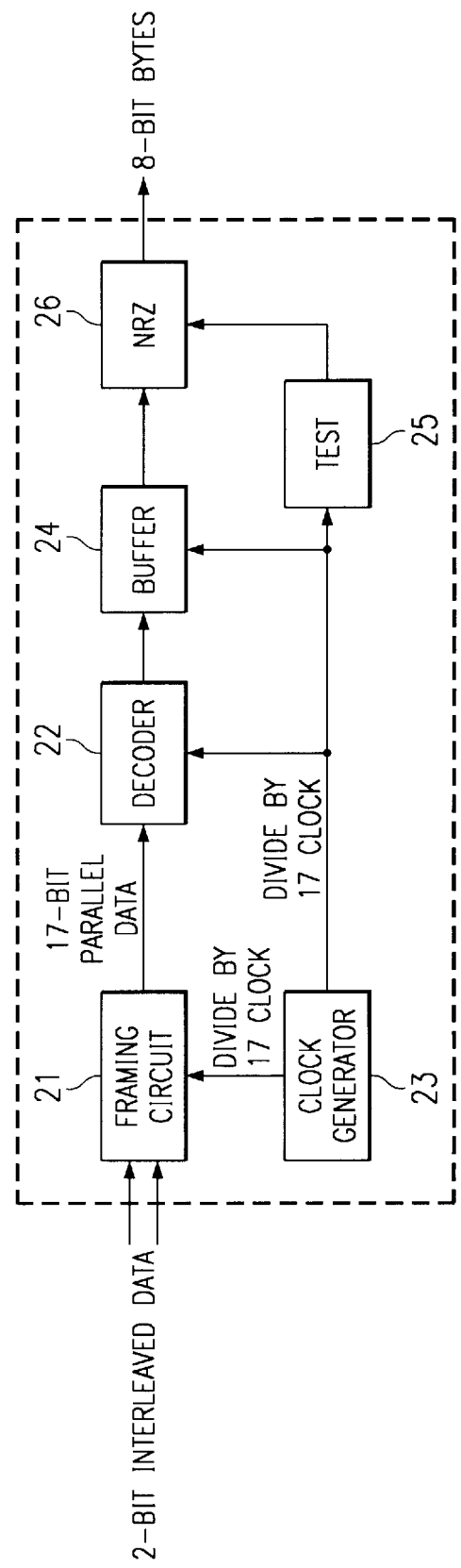
FIG. 2 illustrates the read datapath of FIG. 1.
Figure 3:
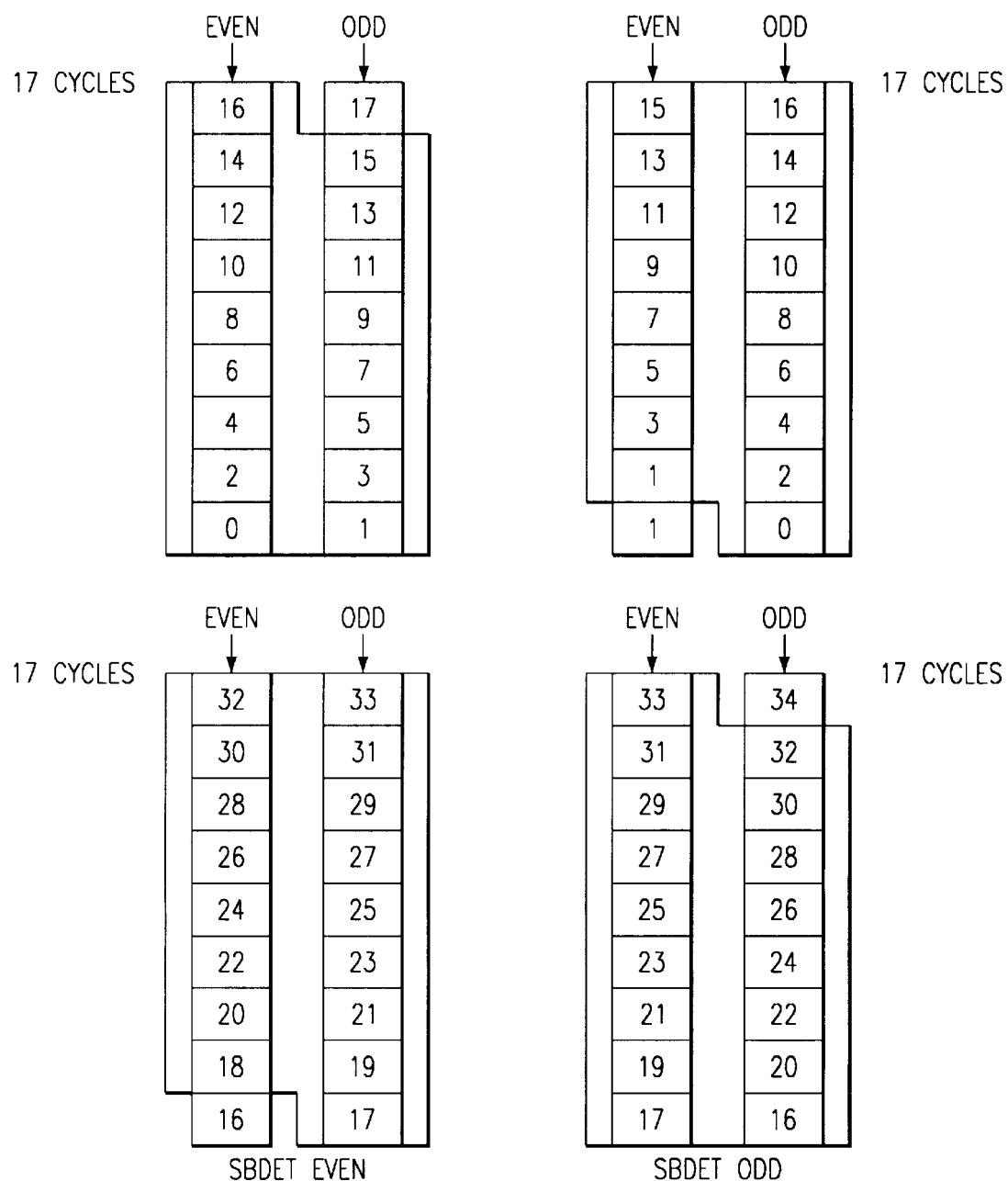
FIG. 3 illustrates serial to parallel data conversion.
Figure 4:
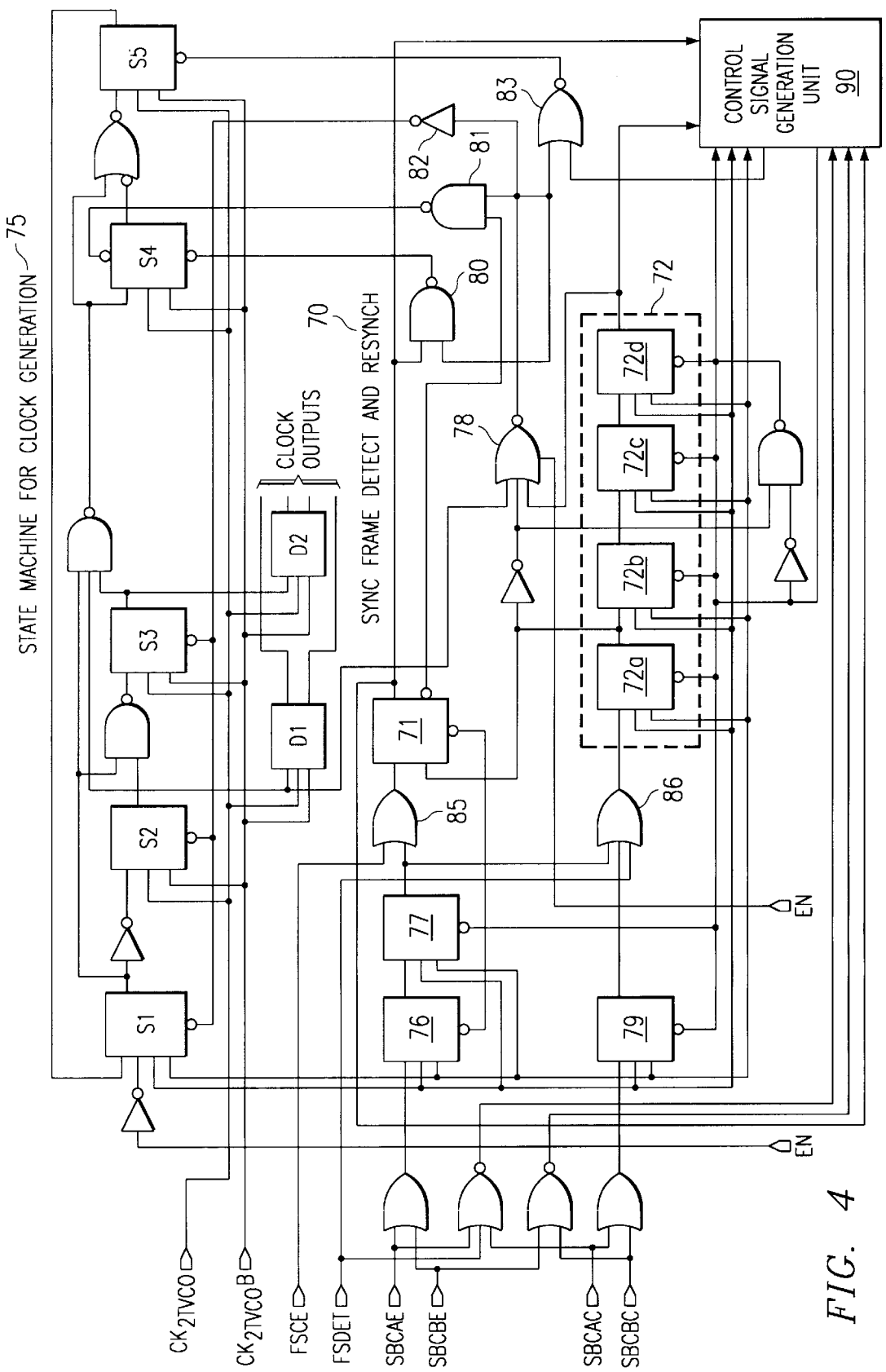
FIG. 4 illustrates clock generation and frame detection circuitry in accordance with the present invention.

FIG. 4 illustrates the interaction between the read clock state machine 75 of FIG. 5 and the Sync Frame Detect and Resynch circuit 70, which is responsible for synchronizing the read clock state machine in accordance with incoming serial data read out from the hard disk 11.

Even and odd serial data streams are presented at SBDAE (SBDAO) and SBDBE (SBDBO) inputs, respectively. There are 2 sync byte detectors for each serial data stream for redundancy purposes. The flip-flops S1–S5 are reset when a sync byte is received indicating the beginning of a data sector. A sync byte is the first non-timing recovery data that is read off the disk. It is 17 bits in length and preceeds any user data. A sync pattern detector searches for the location of the sync byte and signals the read clock generator when it locates the sync byte either on the even or odd interleave. The output of the sync byte detector is input at SBDAE, SBDAO, SBDBE, and SBDBO, corresponding to Sync byte A Detect on Even, Sync byte Detect A on Odd, Sync Byte Detect B on Even, and Sync Byte B Detect on Odd, respectively. In the even case, the state of each of flip-flops S1–S5 are reset to 0. In the odd case, the states of flip-flops S1–S3 and S5 are reset to 0, while flip-flop S4 is reset to 1, as will now be described in detail.

When Sync byte Even is detected, the first conversion cycle will be 18 cycles which requires a 2-cycle delay implemented as two flip-flops (76,77). The output of flip-flop 76 goes high first and the output of flip-flop 77 will follow two clock cycles later. The output of flip-flop 77 is input along with framing detect signal (FSDE) to OR gate 85 the output of which is input to flip-flop 71. This sets flip-flops 71 and 72a high four clock cycles after the sync byte is received. Thus, the output Q of flip-flop 71 will be high (logic "1") and the complimentary output QB will be low (logic "0"). Meanwhile, NOR gate 78 receives as input the inverted output of flip-flop 72a, the output of flip-flop 72d, and the output of flip-flop S2. The 3-input NOR gate 78 will output a logic high only when all of its inputs are logic low, or when the outputs of flip-flops S2 and 72d are low and the output of flip-flop 72a is high.

Flip-flops 72a–d form a delay line 72 that creates a window such that a pulse will be generated when S2=0 to reset the clock in such a fashion that the clock does not have a glitch at the output. The delay line 72 implements a glitchless reset on S2 by creating a window equal to six clock cycles of $CK_{TVCO}$ to ensure that the state machine can only be reset when the output of S2 is low (the maximum period for which the output of S2 is high is four clock cycles of $CK_{TVCO}$). A premature reset on S2 will cause a glitch in the output clock signal which can lead to corrupted data being read out.

The outputs of NOR gate 78 and flip-flop 71 are applied to NAND gates 80, 81, inverter 82, and NOR gate 83. The output of NAND gate 80 controls the resetting of flip-flop S4, the output of NAND gate 81 controls the setting of flip-flop S4, the output of inverter 82 controls the resetting of flip-flops S1–S3, and the output of NOR gate 83 controls the resetting of flip-flop S5.

As indicated, when the input serial data stream will begin on an even cycle, the Q output of flip-flop 71 is logic high and the complementary output QB is logic low. Assume that all three inputs to NOR gate 78 are low and thus the output of NOR gate 78 is high. Thus, a high signal is input to NAND gates 80, 81, inverter 82, and NOR gate 83. The second input to NAND gate 80 is the output Q of flip-flop 71, which is high in the even case, while the second input to NAND gate 81 is the complimentary output QB of flip-flop 71, which is low in the even case. This forces a low output from NAND gate 80 and a high output from NAND gate 81, such that flip-flop S4 is reset. Inverter 82 outputs a logic low which causes flip-flops S1–S3 to be reset. NOR gate 83 receives as its second input the output of flip-flop 72d which is logic low and thus outputs a logic low which causes flip-flop S5 to be reset. Thus in the even case, flip-flops S1–S5 are all reset to 0. Referring to the timing diagram of FIG. 6, this state is represented by the leftmost dotted line indicating initialization of the flip-flops S1–S5 to 00000. The first conversion cycle after initialization is 16 clock cycles long.

When sync byte Odd is detected, the first conversion cycle is 16 cycles and requires only a single flip-flop (79) at the input. The output of flip-flop 79 will go high first and flip-flop 72a will follow after two clock cycles. Framing detect signal (FSDET) is input along with the outputs of flip-flops 77 and 79 to OR gate 86 the output of which is input to flip-flop 72a. The output of flip-flop 71 will remain low. The low-to-high transition of flip-flop 72a will latch in the input to flip-flop 71. Thus, the outputs of NAND gates 80, 81 are opposite those in the even case. Flip-flop S4 is therefore set to 1 rather than reset to 0. The outputs of inverter 82 and NOR gate 83 are the same as in the even case such that flip-flops S1–S3 and S5 are reset to 0. Thus in the odd case, flip-flops S1–S3 and S5 are reset to 0, while flip-flop S4 is set to 1. Referring to the timing diagram of FIG. 6, this state is represented by the dotted line in the middle of the figure indicating initialization of the flip-flops S1–S5 to 01000. The first conversion cycle after initialization is 18 clock cycles long.

After initialization of the flip-flops S1–S5, serial to parallel data conversion occurs until receipt of a sync frame byte that indicates the start of a new sector of data. Then the flip-flops are re-initialized in accordance with the even or odd state, and the data conversion continues.

The Sync Frame Detect and Resynch circuit sends signals to and receives signals from control signal generation unit 90. The control signal generation unit generates signals that coordinate the reading out of data stored on a disk in accordance with the clock signals generated by the state machine 75.

While this invention has been described with reference to an illustrative embodiment, this description is not to be construed in a limiting sense. Various modification to the illustrative embodiment, as well as other embodiments of the invention will be apparent to persons skilled in the art upon reference to this description. It is therefore contemplated that the appended claims will cover any such modifications or embodiments as fall within the true scope of the invention.

What is claimed is:

1. A read clock interface comprising:

means for receiving serial data read out from a disk;

means for receiving a clock signal having a frequency one-half that of a frequency at which said serial data is read out from said disk and for frequency dividing said clock signal to generate a conversion clock signal consisting of alternating conversion cycles each having an even number of cycles of said clock signal; and converting means for converting said serial data to parallel data at each conversion cycle of said conversion signal;

wherein said conversion signal consists of alternating conversion cycles of 16 and 18 cycles of said clock signal.

2. The read clock interface according to claim 1, wherein said serial data is 2-bit interleaved serial data, and wherein said converting means groups said serial data into 17-bit parallel data each conversion cycle.

3. The read clock interface according to claim 2, wherein said 2-bit interleaved serial data consists of odd and even streams of serial data.

4. A read clock interface comprising:

a serial-to-parallel converter for receiving serial data read out from a disk and converting the serial data to parallel data; and a state machine for receiving a clock signal having a frequency one-half that of a frequency at which said serial data is read out from said disk and frequency dividing said clock signal to generate a conversion clock signal consisting of alternating conversion cycles each having an even number of cycles of said clock signal;

wherein said serial-to-parallel converter converts said serial data to parallel data at each conversion cycle of said conversion signal; and wherein said conversion signal consists of alternating conversion cycles of 16 and 18 cycles of said clock signal.

5. The read clock interface according to claim 4, wherein said serial data is 2-bit interleaved serial data, and wherein serial-to-parallel converter groups said serial data into 17-bit parallel data each conversion cycle.

6. The read clock interface according to claim 5, wherein said 2-bit interleaved serial data consists of odd and even streams of serial data.

7. A method of converting serial data to parallel data, comprising the steps of:

receiving serial data read out from a disk;

receiving a clock signal having a frequency one-half that of a frequency at which said serial data is read out from said disk;

frequency dividing said clock signal to generate a conversion clock signal consisting of alternating conversion cycles each having an even number of cycles of said clock signal; and converting said serial data to parallel data at each conversion cycle of said conversion clock signal;

wherein said conversion signal consists of alternating conversion cycles of 16 and 18 cycles of said clock signal.

8. The method according to claim 7, wherein said serial data is 2-bit interleaved serial data, and wherein a converting means groups said serial data into 17-bit parallel data each conversion cycle.

9. The method according to claim 8, wherein said 2-bit interleaved serial data consists of odd and even streams of serial data.

* * * * *